(12) United States Patent
Wu et al.

(10) Patent No.: US 7,796,482 B2
(45) Date of Patent: Sep. 14, 2010

(54) LAND PRE-PIT SIGNAL PROCESSING METHOD AND RELATED APPARATUS

(75) Inventors: Xinyan Wu, Eastleigh (GB); John A. Harold-Barry, Southampton (GB)

(73) Assignee: NXP B.V., Eindhoven (NL)

( * ) Notice: Subject to any disclaimer, the term of this patent is extended or adjusted under 35 U.S.C. 154(b) by 762 days.

(21) Appl. No.: 11/630,093

(22) PCT Filed: Jun. 6, 2005

(86) PCT No.: PCT/IB2005/051834

§ 371 (c)(1),
(2), (4) Date: Dec. 18, 2006

(87) PCT Pub. No.: WO2005/124744

PCT Pub. Date: Dec. 29, 2005

(65) Prior Publication Data

US 2008/0031122 A1 Feb. 7, 2008

(30) Foreign Application Priority Data

Jun. 18, 2004 (GB) ................................ 0413647.9

(51) Int. Cl.
*G11B 20/00* (2006.01)
(52) U.S. Cl. .............. 369/47.17; 369/47.22; 369/47.26; 369/47.27; 369/53.33
(58) Field of Classification Search ............. 369/44.11, 369/47.17, 47.22, 47.26, 47.27, 53.33
See application file for complete search history.

(56) References Cited

U.S. PATENT DOCUMENTS 6,603,726 B1 * 8/2003 Yoshida et al. ......... 369/124.01
6,757,233 B2 * 6/2004 Akabane et al. ......... 369/59.17
7,079,475 B2 * 7/2006 Hagiwara .............. 369/124.12
7,088,651 B2 * 8/2006 Kim ........................ 369/47.22
7,218,583 B2 * 5/2007 Muzio et al. ............. 369/47.17
7,269,107 B2 * 9/2007 Sakata ..................... 369/47.27
7,280,450 B2 * 10/2007 Buchler ................... 369/47.27
7,304,923 B2 * 12/2007 Sano et al. ............... 369/47.17
7,307,936 B2 * 12/2007 Iimura .................... 369/59.21
7,440,367 B2 * 10/2008 Jung et al. ............... 369/47.27
7,496,010 B2 * 2/2009 Ohta et al. ............... 369/47.27
2002/0105870 A1 * 8/2002 Hikima .................... 369/47.25
2005/0041563 A1 * 2/2005 Tawaragi et al. ........ 369/124.01
2005/0047318 A1 * 3/2005 Sakata .................... 369/124.15
2005/0117503 A1 * 6/2005 Yanagawa et al. ....... 369/124.12
2005/0157617 A1 * 7/2005 Woun ..................... 369/47.27

FOREIGN PATENT DOCUMENTS

EP 1 225 570 1/2002

* cited by examiner

*Primary Examiner*—Wayne R Young
*Assistant Examiner*—Brenda Bernardi

(57) ABSTRACT

The invention provides for a method, and related apparatus, of producing a Land Pre-Pit signal during playback of an optical disc and including the steps of obtaining an output signal from an optical detector and from which the Land Pre-Pit signal is to be derived, scaling the said output signal responsive to a determined amplitude of a high frequency crosstalk signal arising during reading of the disc and in a manner so as to increase the said output signal when the Land Pre-Pit identified as corresponding to a mark on the disc, and so as to decrease the output signal when the Land Pre-Pit is identified as corresponding to a space on the disc.

20 Claims, 2 Drawing Sheets

LAND PRE-PIT SIGNAL PROCESSING METHOD AND RELATED APPARATUS

The present invention relates to a Land Pre-Pit (LPP) signal processing method and related apparatus.

Recordable optical discs such as DVD-R and DVD-RW discs are arranged to provide for a LPP signal, which is used primarily for the detection of disc-addressing information and for providing other auxiliary data.

The LPP signal is produced by means of a Land Pre-Pit, which comprises a microstructure embossed at predetermined positions along a land of an optical disc. In current DVD-R and DVD-RW recording systems, the LPP signal is employed during reading from the disc both before and after recording and so as, for example, to confirm the physical address at which data blocks have been written.

However, it has been found that the quality of the LPP signal when data is being read from the disc is disadvantageously limited primarily due to High Frequency (HF) crosstalk arising from the adjacent lands and grooves which, as is known, are arranged to provide for a so-called wobble signal serving to assist with tracking of the optical head of the optical disc drive during recording and playback.

Further, while recording arrangements such as the provision of a push-pull signal normalised on the Radio Frequency (RF) analogue signal can serve to improve the LPP signal within a limited range there is nevertheless a disadvantageous inherent lack of flexibility. Limitations of such techniques within the recording system can further disadvantageously provide a "divided by zero" problem if the offset for the HF crosstalk signal is not appropriately set.

A further disadvantage that arises is that fast-normalisation proves problematic to implement within the digital domain.

The present invention seeks to provide for an LPP signal processing method and related apparatus having advantages over known such methods and apparatus.

According to a first aspect of the present invention, there is provided a method of producing a Land Pre-Pit signal during playback of an optical disc and comprising the steps of:

obtaining an output signal from an optical detector and from which the Land Pre-Pit signal is to be derived;

scaling the said output signal responsive to a determined amplitude of a high frequency crosstalk signal arising during reading of the disc and in a manner so as to increase the said output signal when the Land Pre-Pit is identified as corresponding to a mark on the disc, and so as to decrease the output signal when the Land Pre-Pit is identified as corresponding to a space on the disc.

The invention is advantageous in accurately boosting a small LPP signal, but alternatively attenuating the LPP signal when appropriate. The resealing of the LPP signal based on the amplitude of the HF crosstalk signal advantageously allows for such boosting and attenuation.

The invention therefore advantageously can provide for an offset-independent re-scaling process and which serves to reduce the error rate and/or standard deviation commonly arising in the LPP signal.

Advantageously, the said output signal obtained from the optical detector comprises a push-pull signal, which is to be rescaled, and which further comprises a balanced push-pull signal.

Preferably, the balanced push-pull signal is derived from the difference between a high pass filtered push-pull signal from the optical detector and a high pass filtered high frequency crosstalk signal.

Advantageously, LPP waveform width changes can be compensated by means of a sample-rate-converter.

The method is further advantageous in calculating the LPP signal by means of convolution of push-pull signal along with a LPP-like wavelet.

Further, the scaling factor applied to the said output signal can be fine-tuned by means of a standard deviation step serving to calculate an error rate within the LPP signal.

According to another aspect of the present invention, there is provided a LPP signal processing apparatus arranged for producing a LPP signal during playback of an optical disc and comprising:

means for obtaining an output signal from an optical detector and from which the LPP signal is to be derived;

means for scaling the said output signal responsive to a determined amplitude of a high frequency crosstalk signal arising during reading of the disc and in a manner so as to increase the said output signal when the Land Pre-Pit is identified as corresponding to a mark on the disc, and so as to decrease the output signal when the Land Pre-Pit is identified as corresponding to a space on the disc.

Further features can advantageously be provided such that the apparatus can provide for the further advantages discussed above in relation to the discussion of the method of the present invention.

As discussed, the method and apparatus of the present invention is particular advantageous in reducing the error rate or standard deviation within the LPP signal in particular, by means of offset-irrelevant re-scaling processing and LPP-like wavelet convolution which can be provided in a particularly advantageous embodiment of the present invention.

The invention is described further hereinafter, by way of example only, with reference to the accompanying drawings in which.

Figure 1:
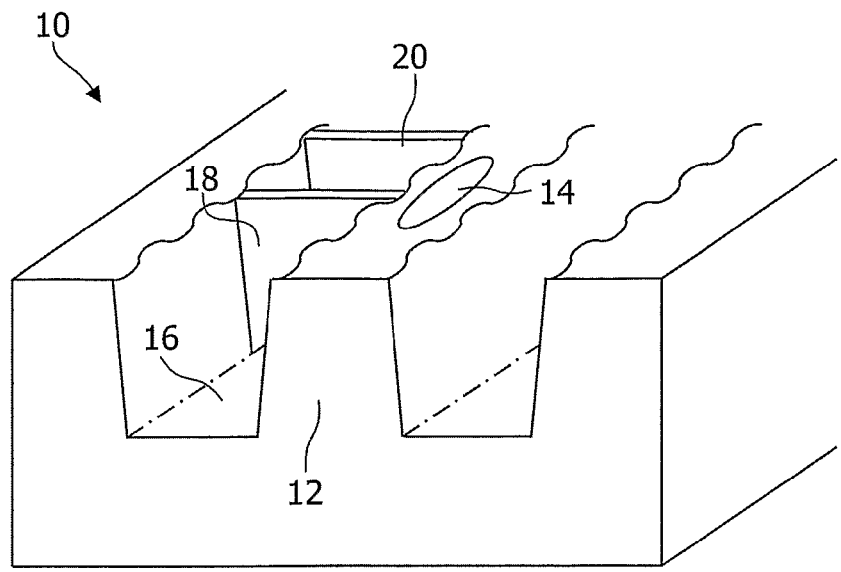
FIG. 1 is a partial perspective view of a section through an optical disc arranged to produce signals for processing in accordance with the present invention.

Turning now to FIG. 1, there is illustrated a section through part of an optical disc 10 to which data can be written and which comprises a spiral of grooves 12 upon which data marks 14 are written by means of an optical read/write head (not shown) and which grooves 12 are separated by spiral lands 16. As will be seen, the upper edges of the lands 16 are formed with a sinusoidal configuration which is arranged to provide for a so-called wobble signal. This signal is arranged to be detected by the optical read/write head and is employed to assist with the accurate tracking of the optical read/write head and as is well known and so is not described further here.

Within the land 16 are illustrated two Land Pre-Pits (LPP) 18,20 which comprise embossed structures provided within the land 16 and which form part of a pre-formatting addressing scheme arranged for identifying physical addresses on the disc where data blocks are to be, or have been, written.

Thus, when reading a disc, in addition to encountering the data mark 14, and the sinusoidal configurations of the upper edges of the lands 16, an output signal is also produced when the optical read/write head encounters each LPP 18,20.

It has however been identified, in particular due to HF crosstalk produced by the disc, that the signal developed from the LPP, i.e. so-called LPP signal, can prove difficult to detect particularly when the LPP is located adjacent a long data mark which will exhibit a low light-reflection characteristic. Such problems do not however arise when a LPP located adjacent a relatively long space on the disc.

Within the present invention, a method and arrangement is provided whereby the amplitude of the LPP signal when located adjacent a mark is increased. Likewise, its amplitude can be decreased through attenuation when it is identified that the LPP is located adjacent a space.

Such re-scaling of the LPP signal advantageously is based advantageously upon the amplitude of the HF crosstalk signal encountered when reading from a disc.

Figure 2:
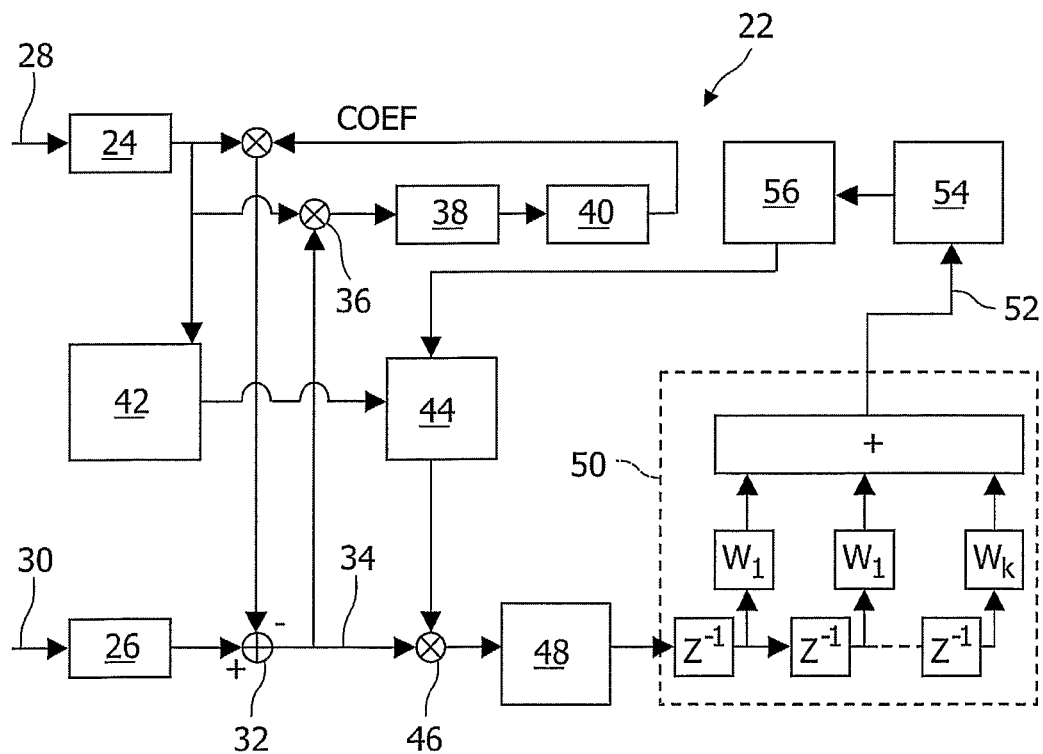
FIG. 2 is a schematic block diagram of an arrangement for achieving the advantages of the present invention.

With regard to FIG. 2 therefore, there is illustrated an example of an arrangement for providing the advantageous LPP processing of the present invention.

The arrangement 22 comprises identical first 24, and second 26, high pass filters which are further arranged to high pass filter the high frequency cross talk signals 28 and push-pull signals 30 derived from the optical read/write head (not shown).

The output of the high pass filtered push-pull signal 30 is then delivered to the difference unit 32 arranged to produce a balanced push-pull signal 34. The balanced push-pull signal 34 is delivered to a multiplier 36 where it is combined with the high pass filtered cross talk signal 28 and delivered to an arrangement for determining a coefficient which is likewise to be applied to the high pass filtered cross talk signal 28 before delivery to the difference unit 32.

In the illustrated embodiment, the coefficient (COEF) is determined by an integrate and dump unit 38 arranged to receive the output from the multiplier 36 and to deliver a signal to a PI controller 40. However, it should be appreciated that, as an alternative, a low-pass filter could be employed in place of the integrate and dump unit 38. It is noted that the sign bit of the HF crosstalk signal 28 can be employed to simplify the aforementioned multiplication at multiplier 36.

The above-mentioned coefficient derived from the PI controller 40 is, as noted, applied to the high pass filtered crosstalk signal 28 and the result delivered to the difference unit 32 from which the balanced push-pull signal 34 is derived.

A peak and bottom detector unit 42 is arranged to receive the output from the high pass filter 24, i.e. the high pass filtered crosstalk signal 28, and so as to detect the peak, and the bottom, of the high pass filtered crosstalk signal 28. The output from this detector unit 42 is employed in turn to control the scaling factor to be applied to the balanced push-pull signal 34 by means of a scaling factor selection unit 44.

As illustrated in FIG. 2, the scaling factor selection unit 44 applies a scaling factor signal to the balanced push-pull signal 34 at a multiplier 46 and the output of the multiplier is delivered in turn to a sample rate converter 48.

The sample rate converter 48 is advantageously employed to compensate the LPP waveform with changes that can arise in a Constant Angular Velocity (CAV) system. The signal then derived is arranged to produce the final LPP signal by means of a convolution unit 50 arranged for convolution of the rescaled balanced push-pull signal and a LPP-like wavelet W in which the wavelet W represents an ideal waveform for the LPP signal. The overall length of the wavelet illustrated by Wk is advantageously determined by the sampling rate, and recording speed, of the optical disc drive system.

As noted, the result of the convolution is output as the required LPP signal 52, which in turn is advantageously delivered to LPP detection and standard deviation unit 54. A signal can be derived from the LPP detection and standard deviation unit 54 and employed by means of a digital signal processor 56, or other appropriate digital hardware. This serves to provide for a fine tuning signal which can be applied to the scaling factor selection unit 44 so as to fine tune the scaling factor applied to the high pass filtered push-pull signal 34 at the multiplier 46. The LPP detection and standard deviation unit 54 is advantageously arranged to calculate an error rate within the LPP signal 52 so as to provide for such fine-tuning.

The scaling factor selection unit 44 operates such that the greater the amplitude of the high frequency crosstalk signal 28, the smaller the scaling factor that is applied to the balanced push-pull signal 34.

As will therefore be appreciated, in the illustrated embodiment, the balanced push-pull signal is rescaled based upon the amplitude of the HF crosstalk signal such that a relatively small LPP signal adjacent a long mark on the disc will be boosted while a relatively large LPP signal located adjacent a long space on the disc will be attenuated.

The aforementioned fine-tuning of the scaling factor enhances the flexibility of the method and arrangement and is advantageously offset-independent.

Also, the "divided by zero" problem encountered within the prior-art advantageously does not arise.

The error rate, or standard deviation, of the LPP signal is advantageously significantly reduced in accordance with the present invention.

Figures 3A, 3B:
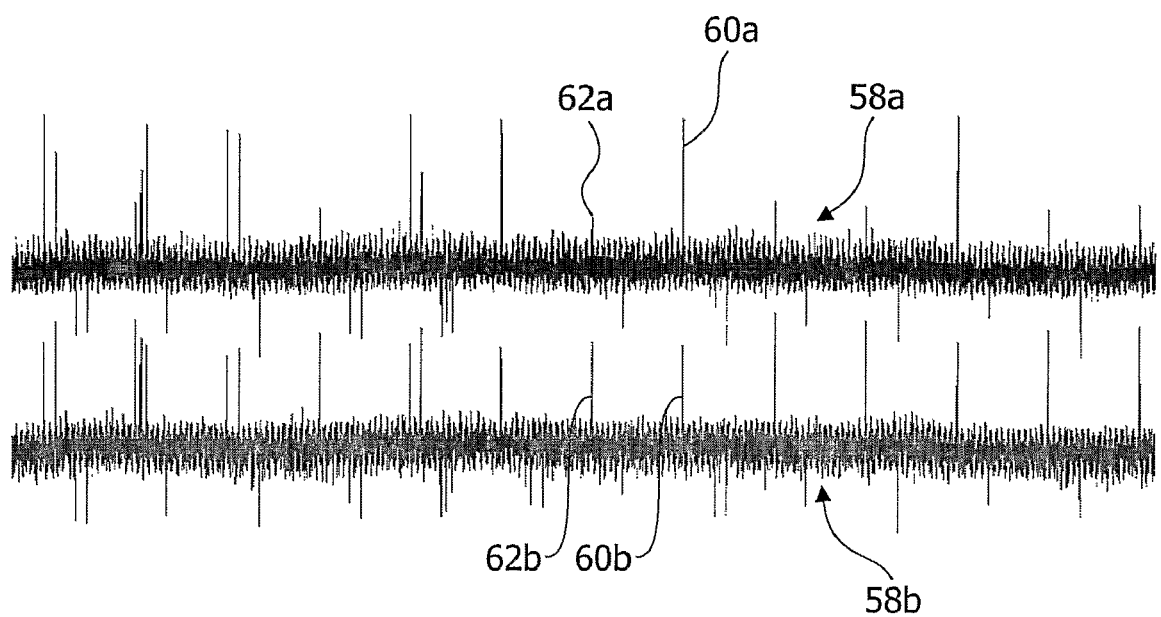
FIGS. 3A and 3B represent traces illustrating the advantageous LPP processing achieved by way of the present invention.

As a further illustration of the advantageous reduction in the error rate of the LPP detection in read mode in accordance with the present invention, reference is now made to FIGS. 3A and 3B.

FIG. 3A, illustrates a trace of a signal derived from an optical disc during read mode in accordance with the prior-art. The centre of the trace 58a represents the wobble signal and the signal spikes 60a and 62a represent LPP signals produced by means of the LPPs of the disc.

The readily discernable LPP signal 60a is that arising from a LPP located adjacent a long space of the disc. The LPP signal 62a of small amplitude, and which is almost lost amongst the wobble signal, is that arising when the LPP is located adjacent a relatively long mark of the disc.

Turning now to FIG. 3B, a corresponding signal derived in accordance with the present invention is illustrated and which again shows a central wobble signal 58B. However, in view of the signal boosting and signal attenuation discussed above, it will be appreciated that both LPP signals 60b and 62b are readily discernible for both the LPP that is located adjacent the relatively long mark, and that is adjacent a relatively long space on the optical disc.

In view of the manner in which it is now possible to readily differentiate the LPP signals from the wobble signal, it will be appreciated that the error rate associated with the LPP signal, particularly in read mode, is advantageously greatly reduced.

The invention claimed is:

1. A method of producing a Land Pre-Pit signal during playback of an optical disc and comprising the steps of: obtaining an output signal from an optical detector and from which the Land Pre-Pit signal is to be derived; and scaling said output signal responsive to a determined amplitude of a high frequency crosstalk signal arising during reading of the disc and in a manner so as to increase said output signal when the Land Pre-Pit is identified as corresponding to a mark on the disc, and so as to decrease the output signal when the Land Pre-Pit is identified as corresponding to a space on the disc.

2. A method as claimed in claim 1, wherein said output signal comprises a push-pull signal.

3. A method as claimed in claim 2, wherein the push-pull signal comprises a balanced push-pull signal.

4. A method as claimed in claim 3, wherein the balanced push-pull signal is derived from the difference between a high pass filtered push-pull signal and a high-pass filtered high frequency crosstalk signal.

5. A method as claimed in claim 1 further including the step of compensating for Land Pre-Pit signal width changes.

6. A method as claimed in claim 5, wherein said compensation is achieved by way of a sample rate conversion step.

7. A method as claimed in claim 1, wherein the Land Pre-Pit signal is calculated by means of a convolution step based on the rescaled output signal.

8. A method as claimed in claim 7, wherein the convolution step includes a Land Pre-Pit-like wavelet.

9. A method as claimed in claim 1 further including the step of calculating an error rate in the Land Pre-Pit signal and processing the error rate so as to fine-tune the scaling of said output signal.

10. A method as claimed in claim 9, wherein the calculation of the error rate is based on the standard deviation of the Land Pre-Pit signal.

11. A Land Pre-Pit signal processing apparatus arranged for producing a Land Pre-Pit signal during playback of an optical disc and comprising: means for obtaining an output signal from an optical detector and from which the Land Pre-Pit signal is to be derived; and means for scaling said output signal responsive to a determined amplitude of a high frequency crosstalk signal arising during reading of the disc and in a manner so as to increase said output signal when the Land Pre-Pit is identified as corresponding to a mark on the disc, and so as to decrease the output signal when the Land Pre-Pit is identified as corresponding to a space on the disc.

12. An apparatus as claimed in claim 11, wherein said output signal comprises a push-pull signal.

13. An apparatus as claimed in claim 12, wherein the push-pull signal comprises a balanced push-pull signal.

14. An apparatus as claimed in claim 13, wherein the balanced push-pull signal is derived from the difference between a high pass filtered push-pull signal and a high-pass filtered high frequency crosstalk signal.

15. An apparatus as claimed in claim 11 further including means for compensating for Land Pre-Pit signal width changes.

16. An apparatus as claimed in claim 15, wherein said means for compensating is arranged to provide for sample rate conversion.

17. An apparatus as claimed in claim 11, further including means for calculating the Land Pre-Pit signal by means of a convolution step based on the rescaled output signal.

18. An apparatus as claimed in claim 17, wherein the convolution step includes a Land Pre-Pit-like wavelet.

19. An apparatus as claimed in claim 1 further including means for calculating an error rate in the Land Pre-Pit signal and processing the error rate so as to fine-tune the scaling of said output signal.

20. An apparatus as claimed in claim 19, wherein the means for calculating the error rate is arranged to apply a standard deviation technique to the Land Pre-Pit signal.

* * * * *